US006328151B1

(12) United States Patent
Spangenberg et al.

(10) Patent No.: US 6,328,151 B1
(45) Date of Patent: Dec. 11, 2001

(54) METHOD AND APPARATUS FOR FEEDING AND FORMING A SINGLE ROW OF CONTAINERS ALONG A CONVEYOR

(75) Inventors: Thomas M. Spangenberg, Baltimore; Cloyd K. Leedy, Jr., Hampstead, both of MD (US)

(73) Assignee: Ambec, Inc., Owings Mills, MD (US)

(*) Notice: Subject to any disclaimer, the term of this patent is extended or adjusted under 35 U.S.C. 154(b) by 0 days.

(21) Appl. No.: 09/498,477

(22) Filed: Feb. 4, 2000

(51) Int. Cl.[7] ............................. B65G 47/14; B65G 47/31
(52) U.S. Cl. ..................... 198/347.4; 198/452; 198/453; 198/836.1; 198/461.3
(58) Field of Search ................................. 198/347.4, 448, 198/452–454, 461.2, 461.3, 836.1, 836.3

(56) References Cited

U.S. PATENT DOCUMENTS

| | | |
|---|---|---|
| 3,934,706 | 1/1976 | Tice . |
| 4,029,195 | 6/1977 | Hartness et al. . |
| 4,054,199 | * 10/1977 | Polderman ........................... 198/452 |
| 4,489,820 | 12/1984 | Schneider . |
| 4,544,059 | 10/1985 | Mernøe . |
| 4,708,234 | * 11/1987 | Born et al. ............................ 198/453 |
| 4,976,343 | * 12/1990 | Fuller ..................................... 198/453 |
| 5,147,023 | 9/1992 | Meindl . |
| 5,170,879 | 12/1992 | Smith . |
| 5,353,915 | 10/1994 | Schneider . |
| 5,551,551 | * 9/1996 | Crawford ............................. 198/453 |
| 5,555,700 | 9/1996 | Marti . |
| 5,647,473 | 7/1997 | Miller . |
| 5,664,662 | * 9/1997 | Wilson et al. ....................... 198/453 |

* cited by examiner

*Primary Examiner*—Christopher P. Ellis
*Assistant Examiner*—Mark A. Deuble
(74) *Attorney, Agent, or Firm*—Crowell & Moring LLP

(57) ABSTRACT

The invention is directed to a method and apparatus for combining randomly oriented containers on a conveyor into single file. The apparatus includes a pressureless combining conveyor having at least two or more conveyor sections adjacent to one another, and angled about the axis of a guide rail. The substantially linear guide rail extends at an angle across the combining conveyor. The guide rail is constructed such that the lower part of a container which starts to fall toward the guide rail contacts the guide rail first, then tilts toward the guide rail, touching the guide rail at a height of the container near the center of gravity of the container, and then returning to its stable position. The container's center of gravity always remains within its stability region. The apparatus includes an input conveyor to supply a plurality of containers having no specific orientation, and an input guide rail section to guide moving containers to one side of the input conveyor. An output conveyor is aligned adjacent to the combining conveyor section for outputting a single-file line of containers and an ejector may be positioned along the output conveyor section to eject fallen containers on the output conveyor.

52 Claims, 4 Drawing Sheets

METHOD AND APPARATUS FOR FEEDING AND FORMING A SINGLE ROW OF CONTAINERS ALONG A CONVEYOR

BACKGROUND AND SUMMARY OF THE INVENTION

The present invention relates to a method and apparatus for conveying containers along a conveyor line and for combining the containers into a single file orientation. More particularly, the present invention is directed to a series of interrelated conveyor sections that are tilted such that as randomly oriented containers are fed along the conveyors, they are caused to combine in a pressureless fashion into a single file orientation along a guide rail while at the same time accelerating in conveyor speed and maintaining their stability.

Oftentimes in bottle or container handling processes, it is important to arrange the containers or bottles from a random grouping to a single-file for processing. For example, when filling containers, it may be important for timing purposes that the containers be in single file for the filling process. Alternatively, during inspection processes, especially optical inspection processes it is advantageous that the containers be in single file to ensure non-interference. When manufacturing process speeds are high, for example greater than about 150 feet per minute, it is often difficult to arrange a random grouping of containers without knocking many of the containers over. This is particularly acute with lighter containers, plastic containers or petaloid-based shaped bottles.

Generally, single filing of a wide stream of containers takes place through the aid of converging rails simultaneously with the containers being transferred to conveyors of sequentially greater speed. This is known as "pressure combining." In such conventional container single filers, blocking, jamming or bridge formations are frequent due to the bottle-bottle pressure involved. In such conventional container single filers, mechanical aids, such as horizontally working vibrators and exocentric-controlled rail movements are therefore used or measures are taken in order to reduce the risk of jamming. The drawbacks of the conventional container pressure combiners increase with increasing capacity and may include:

1. poor operational reliability due to jams and the creation of fallen containers, and
2. generation of wear rings and damage on the containers because of wedge effects.

There are many known techniques and apparatus for aligning randomly oriented containers on a conveyor into single file. U.S. Pat. No. 5,170,879 describes a conveyor system where a plurality of randomly oriented containers are fed at an angle to a conveyor belt dimensioned to convey a single line of the containers. As the containers are fed along the input conveyor, they are forced up against a step shaped guide rail which funnels the containers down to the single file conveyor belt. The single file conveyor belt has holes therein and a vacuum is drawn therethrough to ensure that the containers remain in an upright position. However, during random feeding, the containers are subject to a great deal of impact. At high output speeds, this impact could cause considerable damage to the containers and cause a high number of the containers to be knocked over.

U.S. Pat. No. 4,544,059 describes a conveyor apparatus wherein a random group of containers is fed from one conveyor to another and is re-oriented into a single file. This re-orientation is accomplished through a rotary mechanism and a series of arms which realign the mass group of containers. Again, however, at high speeds the arms may damage the containers or cause them to fall.

Another problem with both of the above-noted apparatus is the complexity and number of parts required. Such a complex device is expensive and subject to frequent downtime due to failure.

Another method and apparatus for forming a single file line of containers on a conveyor is described in U.S. Pat. Nos. 4,489,820 and 5,147,023. These patents teach the use of an at least partially tilted conveyor belt using the effects of gravity to align containers along a guide rail in a single file. An apparatus is disclosed in these patents wherein the end section of the feed conveyor laterally adjacent the intermediate conveyor and the section of the downstream conveyor succeeding the intermediate conveyor are inclined in the same manner as the intermediate conveyor and at such an angle that the resulting declivity drift causes the bottles to slide downwards over the laterally adjacent conveyor portions of the intermediate conveyor, the lowermost side of the feed conveyor being provided with a support railing connected adjacent the intermediate conveyor to the guide surface, the latter being formed as a support surface supporting the bottles at the lower side of the intermediate conveyor.

The apparatus disclosed in U.S. Pat. No. 4,489,820 and 5,147,023, although eliminating some of the problems of the aforementioned apparatus, still suffer from other problems. These apparatus rely on the effects of gravity to ensure that the containers slide downwardly into other containers already aligned on a guide rail. The downward slide of containers causes momentum to build. At high output speeds, that momentum coupled with forward movement, causes instability in the container and thus results in a high number of containers falling over. This is particularly acute with lighter PET and plastic containers which inherently exhibit instability.

What is desired is a combining conveyor system that is capable of outputting a high rate, with chain speeds in excess of 150 feet per minute, in a single file with minimum tip overs.

An object of the invention is to solve the above mentioned disadvantages and therefore to provide an improved combining conveyor for conveying containers while forming a single file orientation. To achieve these and other objects, the present invention is directed to a pressureless combiner conveyor having at least two conveyor sections adjacent to one another, one of which is angled upwardly and angled with respect to the combiner guide rail. The invention includes an input conveyor to supply a plurality of containers having no specific orientation, and an input guide rail to guide moving containers to one side of the input conveyor. Positioned adjacent to the input conveyor section is a combining conveyor section with a substantially linear guide rail, the combining conveyor section being tilted at a predetermined angle along the axis of the guide rail. An output conveyor section is aligned adjacent to the combining conveyor sections for outputting a single-file line of containers and an ejector may be positioned along the output conveyor section to eject fallen containers on the output conveyor.

The guide rail comprises a low-friction material which contacts the lower portion of the containers and provides support for the higher portion of the containers should they impact the rail and start to lean.

According to one aspect of the present invention the tilt angle of the combining conveyor is in a range of from about one-half inch to about one inch per foot of width of the combining conveyor.

According to another aspect of the invention, the combining conveyor includes a plurality of conveyor chains, wherein the conveyor chain closest to the input conveyor runs at a slower speed than the conveyor chain farthest from the input conveyor.

According to still another aspect of the invention the combining guide rail section predetermined angle is a function of one or more of the following variables: container dimensions and stability characteristics, conveyor speed, conveyor tilt angle, rail/bottle contact points, but is generally kept to as small an angle as possible to keep container to rail collisions as inelastic as possible.

According to yet another important aspect of the invention, the combining guide rail is arranged such that it contacts only the lower portion of a container. If the container tips toward the guide rail, then it contacts the upper portion of the guide rail at or near the center of gravity of the container, thereby being stabilized.

The present invention also includes a method for simultaneously conveying and combining a plurality of containers into single file. The method includes feeding a plurality of randomly oriented containers onto an input conveyor and guiding the randomly oriented containers to an edge of the input conveyor and onto an adjacent edge of a combining conveyor. The method further contemplates tilting the combining conveyor by a predetermined angle such that the edge adjacent the input conveyor is lower than the opposite edge of the combining conveyor. The method further includes driving the combining conveyor(s) at increasingly faster speeds than the input conveyor so as to accelerate the containers as they are fed onto and across the combining conveyor. The method further contemplates guiding the containers along the combining conveyor by a guide rail extending across the combining conveyor at an angle determined at least in part by the tilt angle and combining conveyor speed such that containers become aligned in a single file along the guide rail as they are conveyed along the combining conveyor, and outputting a single file line of containers on an output conveyor having an edge aligned adjacent to the combining conveyor.

In another aspect, the present invention provides a method for maintaining the stability of the containers. This is done by providing lower and upper container supports on the guide rail. As a result, if a container contacts the lower container support, it pivots about that point of contact. The momentum causes the container to lean into the upper container support, with the center of gravity of the container remaining within its stability region. The reaction from hitting the upper container support causes the container to pivot back.

The apparatus and method according to the present invention ensures that at output conveyor speeds of greater than 150 feet per minute, a single file orientation of containers can be achieved with a minimum number of fallen containers. The tilted combining conveyor section(s) provides a more stable position for the containers and allows for single filing at slower conveyor speeds, thus discouraging containers from falling. The rail angle and rail/container contact points minimize fallen containers by buffering container/rail collisions.

Other than in the operating examples, or where otherwise indicated, all numbers expressing angles, speeds, or other operating conditions used herein are to be understood as modified in all instances by the term "about".

Other objects, advantages and novel features of the present invention will become apparent from the following detailed description of the invention when considered in conjunction with the accompanying drawings.

DESCRIPTION OF THE PREFERRED EMBODIMENTS

Figure 1:
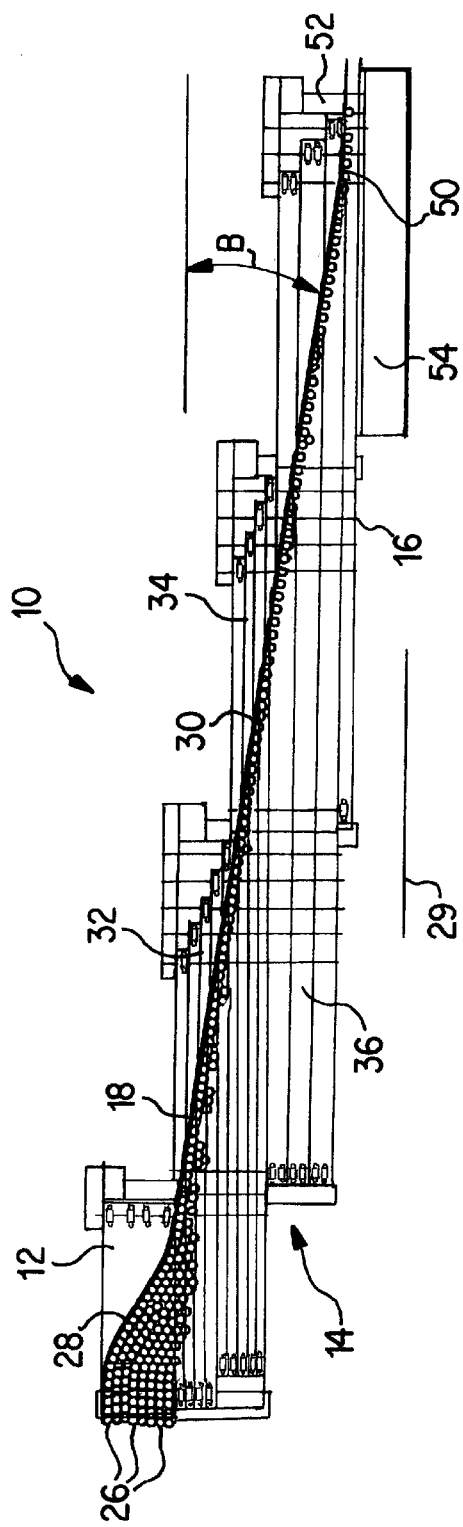
FIG. 1 is a schematic plan view showing a conveyor apparatus according to the present invention.

The invention and advantageous details will now be explained more fully with reference to exemplary embodiments. FIG. 1 illustrates a top view of a pressureless combiner conveyor generally designated by the numeral 10 according to the present invention. Combiner conveyor 10 includes an input conveyor 12, a combining conveyor 14, and an output conveyor 16. Each of conveyor sections 12, 14, and 16 includes at least one conveyor chain which can be formed in any known manner, e.g., chain link, cleat, roller, solid belt, etc., but preferably provides a flat and smooth surface. The use of the term "chain" hereafter is used to denote a conveyor chain, belt, cleat, roller, solid belt, or any other well-known form of conveyor construction.

Figure 2:
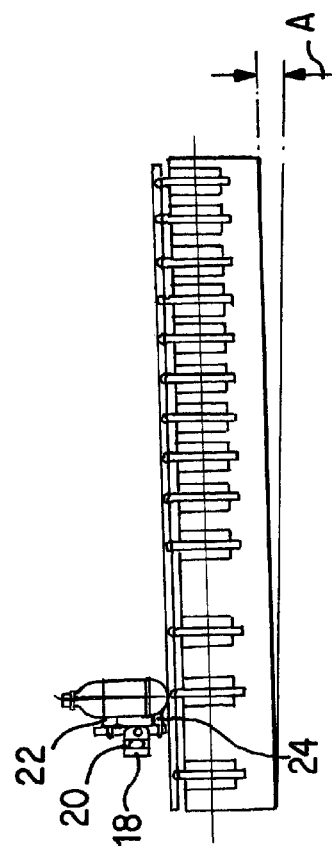
FIG. 2 is a schematic side view in cross-section of a conveyor system according to the present invention.
Figure 4A:
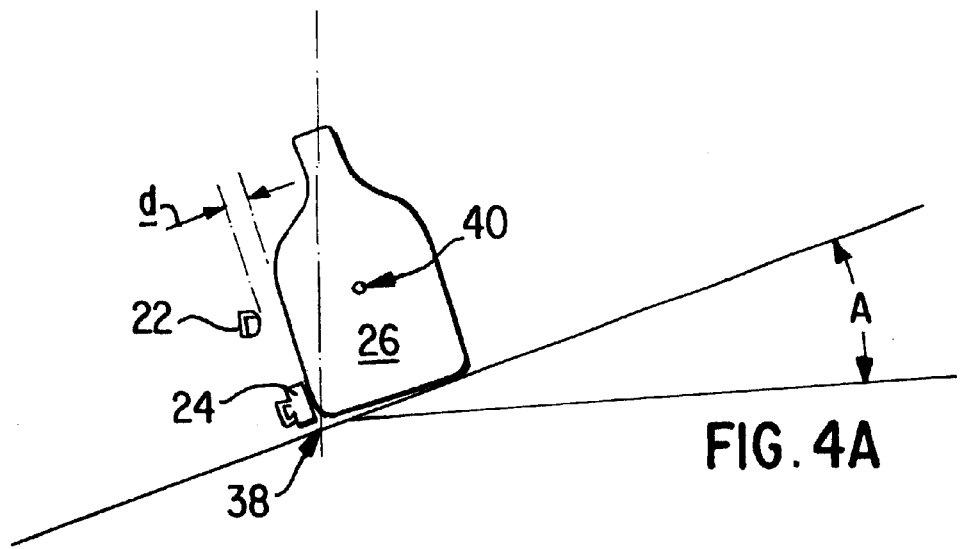
FIGS. 4A–4C schematically illustrate the steps of container/rail collision from initial impact to recovery.
Figure 4B:
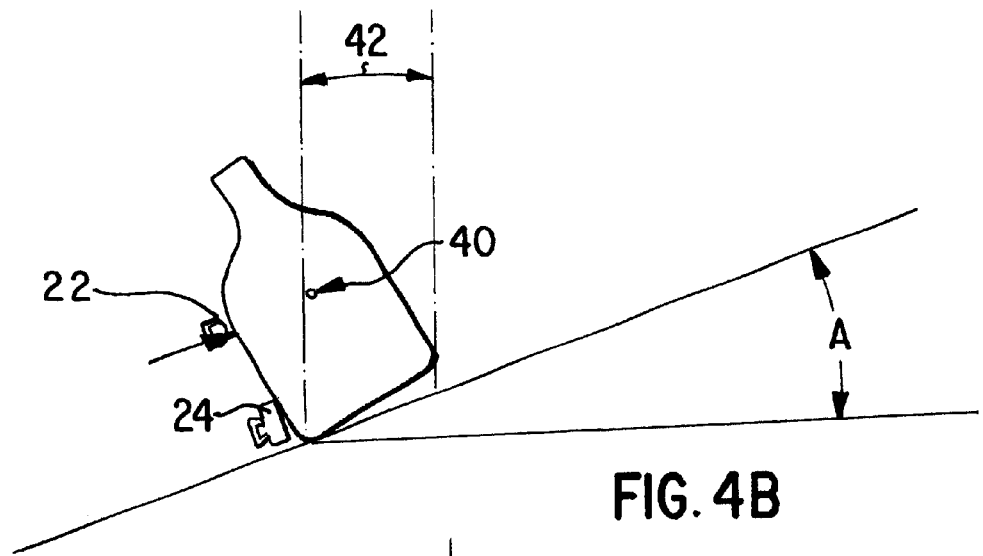

A guide rail 18 (FIG. 2) extends along and across the adjuster 20 which adjusts the height of the guide rail, an upper container support 22 and a lower container support 24. The upper and lower container supports are adjustably positioned by adjuster 20 according to the size of the container so that only the lower container support 24 of the guide rail 18 contacts the container (FIG. 4A). In order to stabilize a container that collides with the rail such that it starts to lean over, the upper container support 22 of the guide rail 18 provides contact with the side of the container so it does not lean too far and fall over (FIG. 4B). In order to minimize the toppling effect the elastic collision may have on the container, the upper container support 22 will coincide with or about the height of the container's center of gravity. The offset d of the upper portion of the rail with respect to the container side is about one-eighth inch. The offset is needed because the containers will spin too much if they are combined with the top rail touching. Too much spin causes fallen containers and degrades the single filing ability. A simpler method is to contact the container at the lower part of the bottle and it does not spin as much. Hence, the offset.

As illustrated in FIG. 1, input conveyor 12 feeds a plurality of containers 26 in a direction indicated by the arrow. The containers are randomly oriented on input conveyor 12 and are several containers in width across input conveyor 12. Guide rail section 28 extends along the length of and across input conveyor 12. Guide rail section 28 which is the input section of guide rail 18 is positioned across input conveyor 12 such that as containers are fed onto the conveyor, a single file line of containers forms along the guide rail section 30. Guide rail section 28 ensures that the plurality of containers is fed across input conveyor 12 and onto adjacent combining conveyor 14.

While the system described herein and illustrated in the drawings shows a single rail 18 which comprises input section 28 and combiner section 30, it will be distinctly understood that physically separate guide rails are equivalent thereto.

Combining conveyor 14 includes at least one conveyor chain that continues to convey containers in the direction of the arrow 29. According to one embodiment of the invention, combining conveyor 14 includes three different conveyor sections, 32, 34 and 36 respectively aligned adjacent to one another. Each of conveyor sections 32, 34 and 36 may comprise one or more individual conveyors of varying width. In the embodiment illustrated in FIGS. 1 and 3, conveyor section 32 includes five conveyors, conveyor section 34 includes four conveyors and conveyor section 36 includes three conveyors. Although illustrated as several different conveyors, it will be appreciated that any type of conveyor arrangement is contemplated within the purview of the invention.

According to the present invention, combining conveyor 14 is tilted at a predetermined angle "A" about the axis of guide rail section 30. Preferably, the tilt angle should be in a range of between about one-half inch and about one inch per foot of width of the combining conveyor 14, and preferably is about three-fourths of an inch per foot of width. The tilt angle may also be varied along the length of combining conveyor 14.

Tilt angle "A" is about the axis of guide rail section 30 so that as the containers are fed along combining conveyor 14 in the direction of the arrow 28, they will be protected against the elastic reaction of the container hitting the rail or other containers.

Figure 4C:
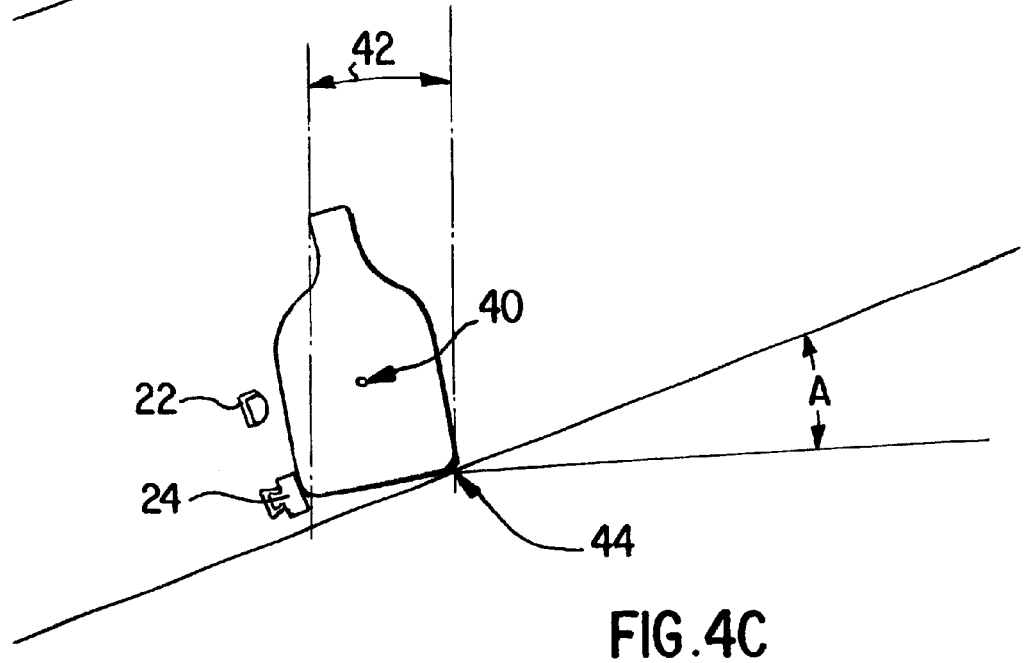

Reference is had to FIGS. 4A–4C which shows the initial impact with the lower portion 24 of the guide rail, followed by the lean until there is contact with the upper portion 22 of the rail, followed by the bounce-back of the containers. The tilt angle "A", as opposed to a level system, serves to keep the container's center of gravity in the stable region (discussed below) because the impact reaction force has to overcome the weight of the container to knock it out of the region. Further the tilt angle "A" accelerates the single-filing process because gravity forces the bottles against the rail. Combining conveyor sections 32, 34 and 36 are each driven faster than the preceding adjacent conveyor section, thus accelerating the speed of container movement. The tilt allows the conveyor section speeds to be slower than they would be if the system were close to level because gravity helps force the containers against the rail. By minimizing the conveyor section speeds, there will be fewer fallen containers because the containers will hit the rail less aggressively.

FIG. 4A shows the initial impact of a container 26 with the lower container support 24 of rail 30. The momentum of the container causes it to lean into the rail at primary pivot point 38 with the center of gravity 40 in the stability region designated as 42, until it contacts upper container support 22 of rail 30 (FIG. 4B). The "stability region" is that vertically extending region delineated by the base corners of the container and in which the center of gravity 40 of the container lies. The reaction from hitting upper container support 22 sends the container back to pivot at secondary pivot point 44. The center of gravity 40 is still in the stability region 42 because the tilt "A" discourages the reaction from sending the container out of the region (FIG. 4C). The rails are shown separately by 22 and 24, but could be a single mass with lower and upper contact points. The rail material will generally be a "hard" low friction plastic or metal, but could also be made from a softer and more energy absorbent material in an effort to further minimize the elasticity of the container to rail collisions.

Figure 3:
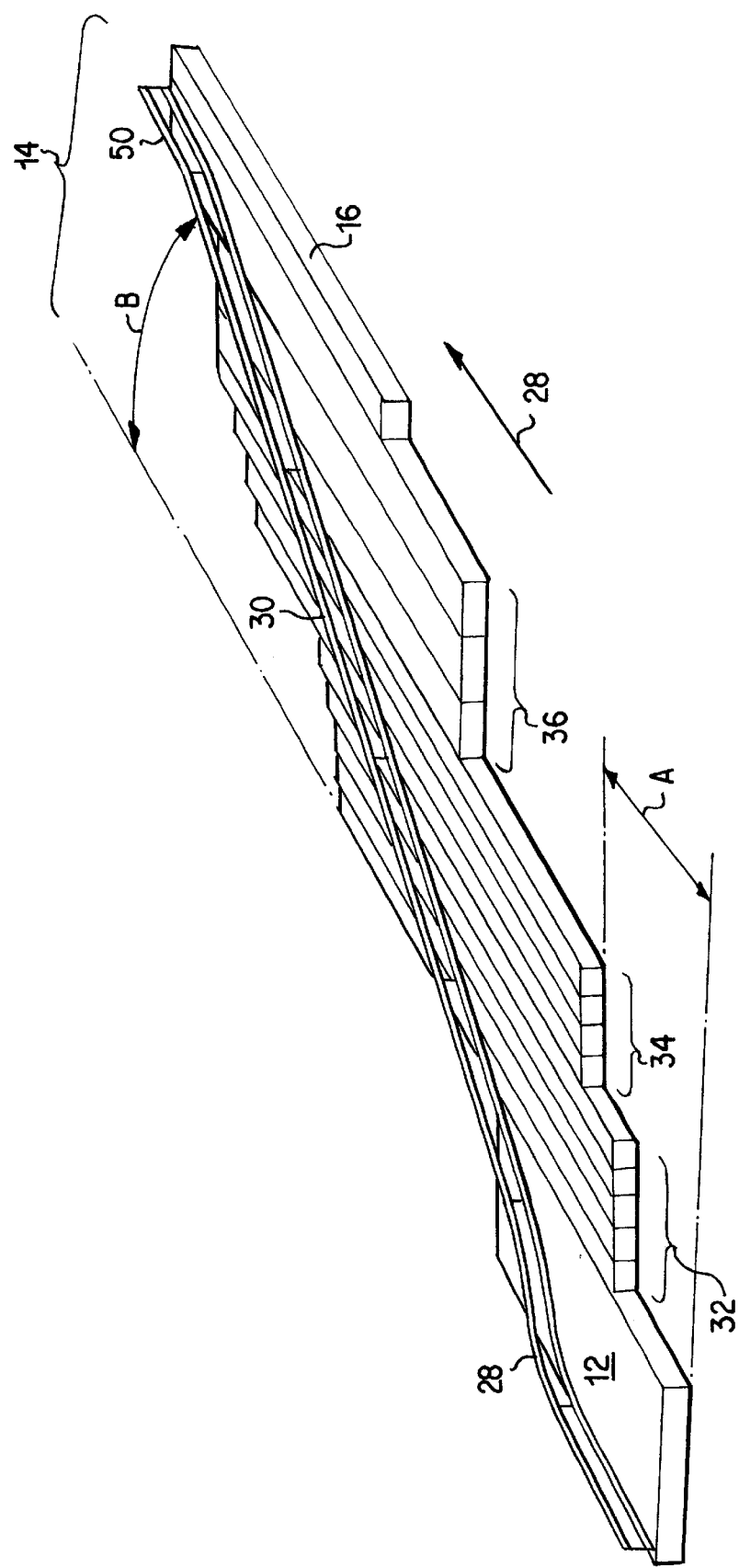
FIG. 3 is a schematic perspective view of a conveyor system according to the present invention.

As shown in FIGS. 1 and 3, guide rail section 30 is set at a predetermined angle across combining conveyor 14. Preferably, guide rail section 30 is set in a substantially straight line across conveyor 14. The extension angle B of guide rail section 30 is determined based on several different operating variables, such as conveyor speed, tilt angle "A", container dimensions and stability characteristics, and rail/bottle contact points. As operating parameters change, extension angle B is also varied, but in general it is preferable to minimize this angle. The set point for angle B should be such that at a given set of variables, the number of containers to fall during conveyance is as small as possible. This angle usually corresponds to from about 6° to about 10°. It will be appreciated by those skilled in the art that operating variable might also dictate the use of a guide rail section which deviates from a straight line.

Figure 5:
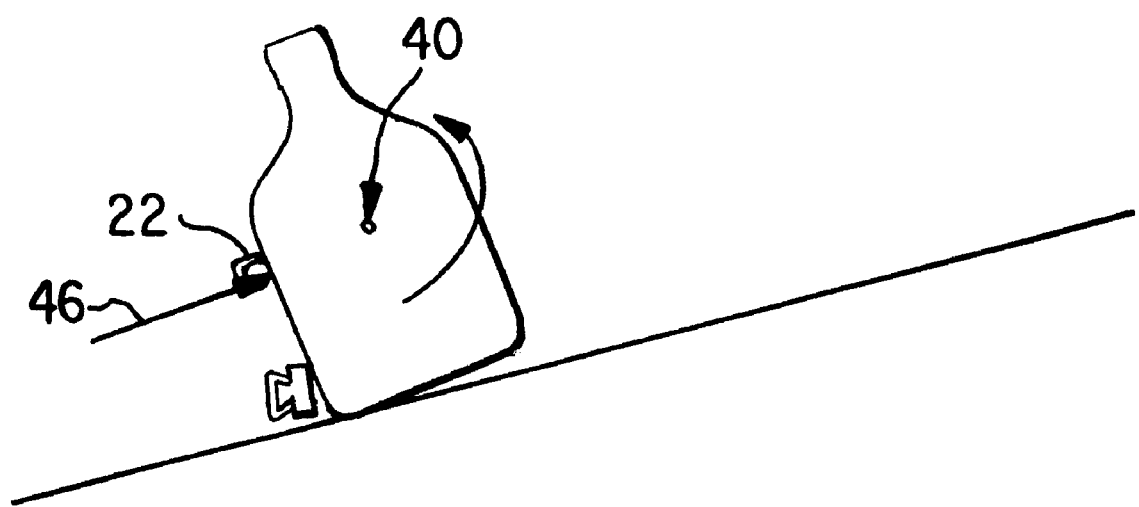
FIG. 5 schematically illustrates the importance of maintaining the upper rail height near the center of gravity of the bottle.

As shown in FIG. 5, the height of the upper container support 22 should be substantially in line, along the direction of force (shown as arrow 46), with the center of gravity 40 of the container. By keeping the height of the upper container support 22 substantially in line with the center of gravity 40 of the container, the moment, or tendency of the container to spin around its center of gravity, can be minimized. This will result in fewer fallen bottles.

The combining conveyor 14 should be long enough to ensure that the containers being fed thereon become aligned in single file. Positioned adjacent the combining conveyor 14 beginning at a point where the containers have become aligned in single file, an output conveyor 16 is provided. Guide rail section 30 is extended to a point to ensure that containers are fed from combining conveyor 14 to output conveyor 16. Output guide rail section 50 extends along output conveyor 16 to ensure that the containers remain stable on the conveyor surface. Although not illustrated, the output conveyor could also be tilted at a predetermined angle similar to the combining conveyor 14.

An ejector 52 may be located at some point along output conveyor 16. Ejector 52 is adapted to eject any container that has fallen on the conveyor 10 that reaches the output conveyor 16. The ejector could also eject containers that have been inspected prior to reaching the ejection point and have been determined as being unsatisfactory. Ejected containers are received in a trough 54 located adjacent to output conveyor 16. The ejector can be of any known type, e.g. pneumatic, robotic, etc., and could be controlled by a central control unit (not shown). A suitable ejector system is that taught in U.S. Patent application Ser. No. 09/359,431, filed Jul. 22, 1999, which is commonly assigned herewith and which is incorporated herein in its entirety by reference.

As described above, the pressureless combining conveyor 10 is preferably set up to output a single file line of containers at a chain speed rate of over 150 feet per minute. Line speed is indicated herein in feet per minute (FPM) rather than containers per minute (CPM) because it is considered to be more appropriate. Feet per minute can easily be calculated by those skilled in the art, for example, as follows:

(1) for 600 CPM of 20 oz. bottles which typically have a diameter of 2.8 inches: 2.8"/bottle×1 ft./12" ×600 bottles/min. =140 FPM (2) for 400 BPM of 2 liter bottles having a diameter of 4.25 inches:

$$4.25 \times \frac{1}{12} \times 400 = 142 \text{ FPM}.$$

A test apparatus according to the present invention was assembled using a combining conveyor approximately 6 feet in width having 14 conveyor chains, and a tilt angle of between ½ inch and 1 inch per foot, rail angle of 6–10° to achieve the 150+FPM output. The input conveyor speed was set at about 35 feet per minute. A three stage combining conveyor comprising a plurality of conveyor chains was driven at various speeds ranging from about 35 feet per minute on the chain closest to the input conveyor to about 250 feet per minute for the outermost chain located adjacent the output conveyor. The intermediate conveyor chains corresponding to section 34, were driven at increasing speeds respectively. The output conveyor was operated at about 250 feet per minute. The entire system used variable frequency drives to operate the motors; slowing and speeding up the system according to downstream requirements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressureless combiner conveyor system, comprising:
    an input conveyor adapted to supply a plurality of containers having random orientation;
    a combining conveyor which comprises at least one side-by side coplanar conveyor section adjacent to the input conveyor, the conveyor sections being driven at different speeds;
    a guide rail spanning said input conveyor and said combining conveyor, said guide rail comprising an input guide rail section and a combining guide rail section;
    said input guide rail section being configured to guide moving containers to the side of the input conveyor which is adjacent the combining conveyor;
    said combining guide rail section being substantially linear, having an axis, and extending at a predetermined span angle across the combining conveyor;
    said combining conveyor sections being tilted at a predetermined tilt angle about the axis of said combining guide rail section; and
    an output conveyor aligned adjacent to the combining conveyor to output a single-file line of containers.

2. A pressureless combiner conveyor system according to claim 1, wherein said combining guide rail section extends at a predetermined angle across the combining conveyor section.

3. A pressureless combiner conveyor system according to claim 1, wherein each of said conveyor sections comprises at least two conveyor chains which are driven at different speeds.

4. A pressureless combiner conveyor system according to claim 1, wherein said combining guide rail section comprises a lower container support and an upper container support extending substantially the full length of the combining guide rail section, said lower container support being adapted to contact the containers at a lower portion thereof, said upper container support being adapted to contact the containers at a height which is near the center of gravity thereof, to thereby maintain the center of gravity of the containers in the stability region thereof, whereby the stability of the containers on said combining conveyor is maintained.

5. A pressureless combiner conveyor system according to claim 1, wherein the tilt angle is in a range of from about one-half inch to about one inch per foot of width of the combining conveyor.

6. A pressureless combiner conveyor system according to claim 5, wherein the tilt angle is about three-fourths of an inch per foot of width of the combining conveyor.

7. A pressureless combiner conveyor system according to claim 1, wherein the span angle is between 6° and 10°.

8. A pressureless combiner conveyor system according to claim 1, wherein the combining conveyor speed is a function of the container diameter.

9. A pressureless combiner conveyor system according to claim 8, wherein the combining conveyor speed is between 35 and 400 feet per minute, and the output conveyor speed is at least 150 feet per minute.

10. A pressureless combiner conveyor system according to claim 9, wherein the input conveyor speed is from about 10 feet per minute to about 40 feet per minute.

11. A pressureless combiner conveyor system according to claim 1, wherein the combining conveyor comprises a plurality of conveyor chains and wherein the conveyor chain closest to the input conveyor runs at a slower speed than the conveyor chain farthest from the input conveyor.

12. A pressureless combiner conveyor system according to claim 11, wherein conveyor chains located between the closest and farthest chains are respectively run at gradually increasing speeds.

13. A pressureless combiner conveyor system according to claim 1, wherein the tilt angle varies along a length of the combining conveyor.

14. A pressureless combiner conveyor system according to claim 1, wherein the output conveyor speed is at least 150 feet per minute.

15. A pressureless combiner conveyor system according to claim 1, wherein said span angle is a function of at least one of container dimensions and stability characteristics, conveyor speed, conveyor tilt angle, and contact point position of the combining guide rail against the containers.

16. A conveying apparatus comprising:
    a combining conveyor;
    a guide rail section having an axis and spanning said combining conveyor at an angle thereto;
    said combining conveyor being tilted at a predetermined angle about the axis of said guide rail section; and
    said guide rail section comprising a lower container support and an upper container support extending substantially the full length of the guide rail section, said lower container support being adapted to contact the containers at a lower portion thereof, said upper container support being adapted to contact the containers at a height which is near the center of gravity thereof;
    to thereby maintain the center of gravity of the containers in the stability region thereof, whereby the stability of the containers on said combining conveyor is maintained.

17. A conveyor apparatus according to claim 16, wherein said combining conveyor comprises at least one conveyor section and wherein each of said conveyor sections comprises at least one conveyor chain which are driven at different speeds.

18. A conveyor apparatus according to claim 16, wherein said tilt angle is in a range of from about one-half inch to about one inch per foot of width of the combining conveyor.

19. A conveyor apparatus according to claim 18, wherein said tilt angle is about three-fourths of an inch per foot of width of the combining conveyor.

20. A conveyor apparatus according to claim 16, wherein the span angle is between 6° and 10°.

21. A conveyor apparatus according to claim 16, wherein the combining conveyor speed is a function of the container diameter.

22. A conveyor apparatus according to claim 21, wherein the combining conveyor speed is between 35 and 400 feet per minute.

23. A conveying apparatus according to claim 16, further comprising an input conveyor adjacent said combining conveyor and adapted to supply a plurality of containers having random orientation, and an input guide rail section configured to guide moving containers to the side of the input conveyor which is adjacent the combining conveyor.

24. A conveyor apparatus according to claim 23, wherein the input conveyor speed is from about 10 feet per minute to about 40 feet per minute.

25. A conveyor apparatus according to claim 23, wherein the combining conveyor comprises a plurality of conveyor chains and wherein the conveyor chain closest to the input conveyor runs at a slower speed than the conveyor chain farthest from the input conveyor.

26. A conveyor apparatus according to claim 25, wherein conveyor chains located between the closest and farthest chains are respectively run at gradually increasing speeds.

27. A conveying apparatus according to claim 16, further comprising an output conveyor aligned adjacent to the combining conveyor for outputting a single-file line of containers.

28. A conveyor apparatus according to claim 27, wherein the output conveyor speed is at least 150 feet per minute.

29. A conveyor apparatus according to claim 16, wherein said tilt angle varies along a length of the combining conveyor.

30. A conveyor apparatus according to claim 16, wherein said span angle is a function of at least one of container dimensions and stability characteristics, conveyor speed, conveyor tilt angle, and contact point position of the guide rail against the containers.

31. A conveyor apparatus according to claim 16, wherein said upper container support is offset behind said lower container support with respect to said container.

32. A method for simultaneously conveying and combining a plurality of containers into single file, comprising;
    feeding a plurality of randomly oriented containers onto an input conveyor;
    guiding the randomly oriented containers to an edge of the input conveyor onto an adjacent edge of a combining conveyor;
    tilting the combining conveyor by a predetermined tilt angle such that the edge adjacent said input conveyor is lower than an opposite edge of said combining conveyor;
    driving the combining conveyor at a faster speed than the input conveyor to accelerate the containers as they are fed onto the combining conveyor;
    guiding the containers along the combining conveyor by a guide rail extending across the combining conveyor at a predetermined span angle determined at least in part by the tilt angle and combining conveyor speed such that containers become aligned in a single file along the guide rail as they are conveyed along the combining conveyor; and
    outputting a single file line of containers on an output conveyor having an edge aligned adjacent to the combining conveyor.

33. A method according to claim 32, wherein said tilt angle is from about one-half inch to about one inch per foot of width of the combining conveyor.

34. A method according to claim 33, wherein the tilt angle is about three-fourths of an inch per foot of width of the combining conveyor.

35. A method according to claim 32, further comprising setting the span angle to between about 6° and about 10° and setting the combining conveyor speed as a function of the container diameter.

36. A method according to claim 32, further comprising driving the combining conveyor at between about 35 and about 400 feet per minute, and driving the output conveyor at least at about 150 feet per minute.

37. A method according to claim 32, wherein the combining conveyor comprises a plurality of conveyor chains, said method further comprising driving the conveyor chain closest to the input conveyor at a slower speed than the conveyor chain farthest from the input conveyor.

38. A method according to claim 37, further comprising driving the conveyor chains located between the closest and farthest chains respectively at gradually increasing speeds.

39. A method according to claim 32, further including variably tilting the combining conveyor along its length.

40. A method according to claim 32, further including driving the output conveyor at a speed of at least about 150 feet per minute.

41. A method according to claim 32, further comprising setting the span angle as a function of at least one of container dimensions and stability characteristics, conveyor speed, conveyor tilt angle, and contact point position of the guide rail against the containers.

42. A method for maintaining stability of articles being conveyed on a combining conveyor which is tilted such that one side is lower than the other side, comprising:
    providing a guide rail section having an axis and spanning said combining conveyor at an angle thereto from the side which is lower to the side which is higher, said guide rail section having a lower container support and an upper container support extending substantially the full length of the guide rail section;
    arranging said lower container support to contact the containers at a lower portion thereof;
    arranging said upper container support to contact the containers a height which is near the center of gravity thereof;
    to thereby maintain the center of gravity of the containers in the stability region thereof, whereby the stability of the containers on said combining conveyor is maintained.

43. A method according to claim 42, wherein said combining container is tilted at a tilt angle of from about one-half inch to about one inch per foot of width of the combining conveyor.

44. A method according to claim 43, wherein the tilt angle is about three-fourths of an inch per foot of width of the combining conveyor.

45. A method according to claim 42, further comprising setting the span angle to between about 6° and about 10° and setting the combining conveyor speed as a function of the container diameter.

46. A method according to claim 45, further comprising driving the combining conveyor at between about 35 and about 400 feet per minute.

47. A method according to claim 42, further comprising providing an input conveyor adjacent said combining conveyor and adapted to supply a plurality of containers having random orientation, and an input guide rail section configured to guide moving containers to the side of the input conveyor which is adjacent the combining conveyor, and driving the input conveyor at from about 11 feet per minute to about 40 feet per minute.

48. A method according to claim 47, further comprising driving the combining conveyor at between about 35 and about 400 feet per minute, and driving the output conveyor at least at about 150 feet per minute.

49. A method according to claim 48, wherein the combining conveyor comprises a plurality of conveyor chains, said method further comprising driving the conveyor chain closest to the input conveyor at a slower speed than the conveyor chain farthest from the input conveyor.

50. A method according to claim 49, said method further comprising driving the conveyor chains located between the closest and farthest chains respectively at gradually increasing speeds.

51. A method according to claim 42, further including variably tilting the combining conveyor along its length.

52. A method according to claim 42, further comprising setting the span angle as a function of at least one of container dimensions and stability characteristics, conveyor speed, conveyor tilt angle, and contact point position of the guide rail against the containers.

\* \* \* \* \*